United States Patent
Fraivillig

(10) Patent No.: US 10,599,746 B1
(45) Date of Patent: Mar. 24, 2020

(54) DETERMINING REAL TIME ZERO-SUM EVENT PROBABILITIES FROM INTERNET REPORTED BETTING ODDS

(71) Applicant: James B. Fraivillig, Boston, MA (US)

(72) Inventor: James B. Fraivillig, Boston, MA (US)

( * ) Notice: Subject to any disclaimer, the term of this patent is extended or adjusted under 35 U.S.C. 154(b) by 89 days.

(21) Appl. No.: 15/881,731

(22) Filed: Jan. 27, 2018

Related U.S. Application Data

(60) Provisional application No. 62/499,470, filed on Jan. 27, 2017.

(51) Int. Cl.
　*A63F 9/24*　　(2006.01)
　*G06F 17/18*　　(2006.01)
　*G07F 17/32*　　(2006.01)

(52) U.S. Cl.
　CPC ............ *G06F 17/18* (2013.01); *G07F 17/323* (2013.01); *G07F 17/3288* (2013.01)

(58) Field of Classification Search
　CPC ..... G07F 17/3288; G07F 17/18; G07F 17/323
　See application file for complete search history.

(56) References Cited

U.S. PATENT DOCUMENTS

| | | | |
|---|---|---|---|
| 2005/0003878 A1* | 1/2005 | Updike ................. | G06Q 50/34 463/16 |
| 2011/0275432 A1* | 11/2011 | Lutnick ............... | G07F 17/3232 463/25 |
| 2013/0102372 A1* | 4/2013 | Lutnick ............... | G07F 17/3293 463/13 |
| 2015/0228160 A1* | 8/2015 | Georgiopoulos ..... | G07F 17/326 463/16 |

\* cited by examiner

*Primary Examiner* — Steve Rowland
(74) *Attorney, Agent, or Firm* — John M. Brandt

(57) ABSTRACT

A real-time method for determining zero-sum event probabilities for a selected contest between at least two participants, employing a computer connected to the internet, from reported betting odds from a betting market available on the internet which method includes determining event probability based on the relative inverse payout of the result's occurrence compared to the summed inverse payouts of that results' non-occurrence, i.e., competitive zero-sum results on a given betting platform.

4 Claims, 1 Drawing Sheet

| 2018 Super Bowl win | | | |
|---|---|---|---|
| Team | Odds/Payout | IPR | Probability |
| New England Patriots (odds 7/4) | $1.75 | 0.57 | 41.8% |
| Minnesota Vikings | $4.00 | 0.25 | 18.3% |
| Pittsburgh Steelers (odds 11/2) | $5.50 | 0.18 | 13.3% |
| New Orleans Saints | $8.00 | 0.13 | 9.1% |
| Atlanta Falcons | $9.00 | 0.11 | 8.1% |
| Philadelphia Eagles | $15.00 | 0.07 | 4.9% |
| Jacksonville Jaguars | $22.00 | 0.05 | 3.3% |
| Tennessee Titans | $66.00 | 0.02 | 1.1% |
| *January 10, 2018* | TOTAL: | 1.37 | 100.0% |

| 2018 Super Bowl win | | | |
|---|---:|---:|---:|
| Team | Odds/Payout | IPR | Probability |
| New England Patriots (odds 7/4) | $1.75 | 0.57 | 41.8% |
| Minnesota Vikings | $4.00 | 0.25 | 18.3% |
| Pittsburgh Steelers (odds 11/2) | $5.50 | 0.18 | 13.3% |
| New Orleans Saints | $8.00 | 0.13 | 9.1% |
| Atlanta Falcons | $9.00 | 0.11 | 8.1% |
| Philadelphia Eagles | $15.00 | 0.07 | 4.9% |
| Jacksonville Jaguars | $22.00 | 0.05 | 3.3% |
| Tennessee Titans | $66.00 | 0.02 | 1.1% |
| *January 10, 2018* | TOTAL: | 1.37 | 100.0% |

DETERMINING REAL TIME ZERO-SUM EVENT PROBABILITIES FROM INTERNET REPORTED BETTING ODDS

CROSS REFERENCE TO RELATED APPLICATIONS

This application is a based on U.S. provisional patent application No. 62/499,470 filed Jan. 27, 2017 by the same inventor and is hereby incorporated by reference.

BACKGROUND OF THE INVENTION

Field of the Invention

The invention resides in the field of probability outcomes for zero-sum contests which are the subject of betting market operations available on the internet.

Description of the Prior Art

Predicting future events, which are by nature uncertain, is of great interest to many people who often enjoy wagering on what specific event result will come to pass. The main focus of both human interest and wagering is generally on zero-sum events, such as sports, elections and awards. Due to the commitment of financial stakes by the willing participants, betting markets, which provide widely reported odds and accept bets on said events, are often considered the most accurate predictor of event results, generally besting expert analysts.

Existing probability calculation models derived from reported betting odds are often inaccurate. On zero-sum competitive events, such as an election between Candidate A and Candidate B, these existing models analyze the betting activity of each singular outcome, for example, victory by Candidate A independently of other outcomes to determine a non-relative probability of election of Candidate A. The separate non-relative probability analyses of each outcome (first analyzing the odds of victory by Team A, then separately analyzing the odds of victory by Team B) are combined, and the data is normalized to have a summed probability of 100%, as the combined probabilities of zero-sum competitive-outcome events must be. This approach distorts the data, as the chances of low-probability outcomes are overestimated, while the chances of high probability outcomes are underestimated.

It is also important to note that all betting houses set the given odds of each specific outcome to factor in event uncertainty, as well as to profit for their efforts, regardless of the final result of the event. Betting houses wouldn't be in business long if they did not. This factor also distorts the probability analysis method described above.

In recent United States elections, ElectionBettingOdds.com provides a popular service where probabilities of zero-sum competitive results, the election of specific candidates in given races, are reported. ElectionBettingOdds.com uses Betfair, a UK betting house, for their odds data. The methodology of ElectionBettingOdds.com, outlined above, is described in detail on their website as excerpted below, using the 2016 U.S. Presidential election as an example, as follows.

"This site simply averages the market Bid and Ask prices to come up with the odd. The odds on Betfair are not expressed as percentages and have to be converted. The conversion formula is 1/x, where x is the Betfair price. For example, on Betfair a candidate will trade at 50. That means the candidate has a 1/50=2% chance of winning.

ElectionBettingOdds.com converts the Betfair odds to percentages, and then averages them. Specifically, the formula is: ((1/Bid+1/Ask)/2).

This generally gives intuitive results. For example, on Betfair, an election candidate may have a Bid price of 50 and an Ask price of 25. In other words, the bid is (1/50=2%) and the ask is (1/25=4%). It seems logical that the implied chance is the average: 3%.

But the sites mentioned above do not do that. Instead of calculating the percentages and then averaging those, they average the Betfair numbers first. Their formula is 1/((Back+Lay)/2) which, in the candidate example above, would yield 2.66% instead of 3%.

This is a particular issue for low odds. For example, if a candidate on Betfair has a spread between 1000 (0.1%) and 100 (1%), this site's formula would conclude that the odds are the average: 0.55%. But the other sites' formulas would compute the odds to be just 0.18%. In general, their formula skews odds towards 0% probability and 100% probability. Although it is theoretically possible that skewing the odds in that way makes them better at predicting events, there does not seem to be hard evidence for that notion.

So ElectionBettingOdds.com uses the simple averaging method because it most faithfully depicts the odds themselves without alteration."

As noted earlier, the conventional focus is on the independent analyses of the odds of each competitive outcome, in this case the chance of victory by a candidate. ElectionBettingOdds.com even splits the difference between the bid and ask prices of wagers on each candidate on the way to estimating his or her probability. When the individual outcome odds are close to each other, like 50:50, probability distortion is minimal with this method, but can be severe when result odds are lopsided, as with a heavy favorite.

In the book 'Mathletics' (2009, Princeton University Press), Wayne Winston described how the odds on what team will win a game can be used to establish a probability for each team, but again these individual team-victory probabilities are determined for each team, independently, and then are averaged for a "true chance".

An excerpt from Winston's book is shown below, where he explains the 'money line', which is an odds-reporting method for wagering on who wins, as well as determination of result probabilities of the 2007 National Basketball Association (NBA) Final from these odds.

"How Does the Money Line Work?

The money line enables a bettor to bet on who wins a game or an event, not the margin of victory. For example, the money line on the 2007 NBA Finals was Spurs −450, Cavaliers +325. For any money line the team with the negative number is the favorite and the team with the positive number is the underdog. The meaning of this money line is that to win $100 on the Spurs you must bet $450. Thus if the Spurs win the series I win $100 but if the Spurs lose I lose $450. If you bet $100 on the Cavaliers you win $325 if the Cavs win and lose $100 if the Cavs lose. Let p=probability that the Spurs win the series. A gambler who believes that $100p-450(1-p)>0$ would bet on the Spurs while a gambler who believes that $325(1-p)-100p>0$ would bet on the Cavaliers. Solving for the value of p that satisfies each in equality, we find that gamblers who feel the Spurs have a chance greater than 9/11=82% of winning would bet on the Spurs, while gamblers who feel that the Spurs have a p<13/17=76% chance of winning would bet on the Cavs. If we assume that the true probability of the Spurs winning was the average of 76% and 82% (79%) and also assume that bettor estimates of the Spurs' chances of winning are symmetrically distributed about 79%, then we would expect an equal number of bettors to bet on Cleveland and San Antonio. Suppose one gambler bets on the Spurs and one on the Cavs. If the Spurs win the bookmaker breaks even by paying the Spurs bettor $100 and collects $100 from the Cavs bettor. If the Cavs win the bookmaker wins $125 by collecting $450 from the Spurs bettor and paying $325 to the Cavs bettor. If the Spurs' true chance of winning the series is 79%, then the gambler's expected profit per dollar bet is given by (0.79(0)+0.21(125))/(450+100)=4.8%."

Winston's calculation of the probability of the favored Spurs championship is 79%, the average of his two calculations from the probability of each team of 76% and 82% based on the respective odds of each team. This severely understates the actual probability; this invention would show the probability of a Spurs victory as 93.6% (the methodology is described below in detail). In this case, the money line odds need to be reconfigured for the probability calculation, so the Spur's -450 odds becomes 0.222 (100/450, a payback of $0.222 on a $1 wager), and the Cavalier's +325 odds becomes 3.25 (325/100, a payback of $3.25 on a $1 wager).

SUMMARY OF THE INVENTION

The invention may be summarized as a real-time method for determining zero-sum event probabilities for a selected contest between at least two participants, employing a computer connected to the internet, from reported betting odds from a betting market available on the internet which method includes at least the following steps of
1. providing an internet connected computer,
2. selecting a zero-sum contest event having at least two participants wherein accessed betting odds are available for each participant in said event on said internet from at least one betting market;
3. selecting a first favorite participant with the lowest available odds, these odds having an associated first projected bet payout;
4. selecting one or more additional participants where such additional participants exist, for example, in an election or a multiple team sports event, with higher available odds, such higher odds each having an associated additional projected bet payout wherein all of the above payouts are based on a uniform amount wagered; and
5. selecting an individual one, designated i, of all of the participants and calculating, employing the computer, the probability, Pi, of success in the contest event for the selected participant i by the formula:

$$Pi \text{ equals } \frac{1/Payout_i}{\sum(1/Payout_1 + 1/Payout_2 \ldots + 1/Payout_i \ldots 1/Payout_x)} \times 100\%$$

wherein the numerator comprises the inverse payout ratio of participant i and wherein the denominator comprises the sum of all participant inverse payout ratios, from 1/Payout 1 to 1/Payout x for all participants from 1 to x where x is the total number of participants.

The method of the invention employing the internet as a data source provides the only way in which the relative probabilities of success of multiple participants in a single contest may be obtained in real time due to the rapid shifting or fluctuation of odds over short periods of time even during the course of a game in play for sporting events. Additionally, the odds of multiple betting markets for the same contest may be added and their probabilities averaged with others to be included in final probability projections for greater accuracy.

Features and advantages of the invention include the following:

Enhancing Existing Betting Markets

This technology would edify bettors, as well as the general public that follows competitive events. Reporting the probability of an event result based on existing wagers on odds would be a stark reality-check, especially for myopic bettors.

This technology could create a 'virtuous cycle' in betting on event results, as it could encourage the following: better odds from betting houses resulting in higher paybacks and less house-take, increased wagering by better-informed bettors, and the involvement of more participants in wagering. In addition, it could facilitate betting houses and other legal entities to initiate odds-making on new and novel events.

Information Source

It was been noted that the wisdom of the public is generally better at predictions than experts. As crowd-sourced betting odds are often the best way to predict future results, they are the most credible accumulated information source. This technology can produce ever-adjusting, real-time event result probabilities, even during an event in progress. Sports betting houses adjust their odds during games, until victory by one team is assured, generally at 99%+probability.

This technology can be used as the basis for establishing betting pools on new and novel events among knowledgeable and/or numerous betting participants. The probabilities on the said event results could be very edifying, and this information would have considerable value.

Entertainment

Event result probabilities and their inherent ongoing fluctuations could be found fascinating by participants in the events, participants in the wagering on the events, and general observers interested in the events. For instance, many sports fans are "numbers junkies", and love to do data analyses for predictions. Event result probabilities are the ultimate bottom line in sports numbers.

An ever-adjusting information stream is a product of this invention. The information stream would be licensable to media outlets. For example, a TV program or segment or sidebar/bottom scroll could cover the event result probabilities and their changes on upcoming and ongoing events.

Many aspects of modern media are awards focused. As with sports and politics, odds can be set for entertainment awards, and these can be used to determine event result probabilities.

Judicial

This technology would provide a straightforward tool to monitor possible "fixing" of events, where one or more involved parties, i.e., insiders, conspires to affect the results. As the gain for event-fixing is generally monetary, insider bets would skew odds, and therefore the result probabilities. In many sports, there are credible math models used to predict an event result with existing data, even while the event is underway. A discrepancy between the odds based probability of an event result and its math model could raise suspicion of insider activity.

Education

This technology could be used as a tool to generate interest to facilitate teaching about events and the factors that influence their outcomes. It clearly demonstrates the uncertainty of future possible results, and could help to cope with, and plan for, those eventual possible realities.

DESCRIPTION OF THE DRAWING

The FIGURE is a chart illustrating the various steps and aspects of the method of the invention.

DESCRIPTION OF THE PREFERRED EMBODIMENT

The payout on betting odds provides a clear indicator of an event result's probability, but it needs to be compared directly to the payout on the odds of the result's not occurring. Therefore, determining event probability is based on the relative payout of the result's occurrence compared to the summed payouts of that result's non-occurrence, i.e., competitive zero-sum results on a given betting platform or market.

The betting market could be a single betting house, for example, Betfair located in the United Kingdom or a composite of multiple betting-house odds, for example, Odds-Checker, also located in the United Kingdom. Betting odds are reported as numbers, often fractional numbers. The term 'payout' is defined as the profit above the amount wagered on betting on a given result. For example, for a wager on the occurrence of Result A:

If the odds of Result A occurring is '½', that means that payout on $1 wager will be $0.50.

If the odds of Result A occurring is '2' or '2/1', that means that payout on $1 wager will be $2.

If the odds of Result A occurring is '12/7', that means that payout on $1 wager will be $1.71 (or 12 divided by 7).

If Result A does occur, the $1 wager is also returned to the bettor, along with the payout.

If Result A does not occur, there is no payout and the initial $1 wager is lost, i.e., the house keeps the bet.

In zero-sum competitive events, there are a limited amount of possible outcomes. In most sporting contests, between Team A and Team B, there is generally only two possible outcomes: either Team A wins or Team B wins. In some sporting events between two teams, ties are sometimes a third option, and so the odds of a tie are also wagered. In some sports and elections, multiple entities compete, such as horse racing, with all having individual odds of victory. This invention can factor in multiple outcome results, utilizing the odds on each and every outcome result.

To calculate the relative probabilities of the various results, it is necessary to account for the relative payouts of each of the competing results with respect to the payout on the favored result for a given wager. Inverse Payout Ratio (IPR) is the inverse of the payout for a $1 wager. The favored would naturally have the highest IPR; the underdog(s) results would have higher payout(s) and therefore lower IPR(s). When all competing result's IPRs are summed in the denominator, this provides the basis for calculating individual result probabilities Pi given by the formula:

$$\frac{1/Payout_i}{\sum(1/Payout_1 + 1/Payout_2 \ldots + 1/Payout_i \ldots 1/Payout_x)} \times 100\%$$

A chart illustrating an example of the various components and steps of the method utilizing an internet connected computer is presented in the drawing. This invention can be demonstrated on the National Football League (NFL) playoffs in the 2017-2018 postseason, when there were eight teams remaining in contention, in what team might win the Super Bowl. The teams' odds and their respective calculated probabilities of winning the Super Bowl are shown below (Odds/Payout assumes a $1 wager; odds from Oddschecker compilation, Jan. 10, 2018). The chart shows the calculation steps to reach the inverse payout ratios which are combined in the formula above to give the probabilities predicted by the invention.

As an example of how existing probability models based on reported odds miscalculate teams' probability in events, the 2018 Super Bowl between the New England Patriots (NE) and the Philadelphia Eagles (PHI) is given on ElectionBettingOdds.com as having the following probabilities on Jan. 26, 2018: NE at 65.1% and PHI at 34.8%. The betting house that ElectionBettingOdds uses as a basis, Betfair.com, had the odds payouts of NE at $0.44 for a $1 wager and PHI at $2.00 for a $1 wager (Jan. 26, 2018). This invention calculates those Betfair odds into probabilities of victory by NE at 82.0% and PHI at 18.0%, a significant departure from ElectionBettingOdds.com's determination based on the same data, as the probability of the favorite (NE) is understated and the probability of the underdog (PHI) is overstated.

What is claimed is:

1. A method of determining zero-sum event probabilities from accessed betting house odds available on an internet site, said method comprising in combination:
   A. providing a computer;
   B. providing an internet connection for said computer,
   C. connecting said computer to said internet;
   D. selecting a zero-sum contest event having at least two participants wherein accessed betting odds are available for each participant in said event on said internet from at least one betting market;
   E. calculating the projected bet payout from all of said assessed betting odds for each of said participants wherein all of said payouts are based on a uniform amount wagered; and
   F. selecting an individual one, i, of said participants and calculating, employing the computer, the probability, Pi, of success in said contest event for said selected individual one, i, of said participants by the formula:

$$Pi \text{ equals } \frac{1/Payout_i}{\sum(1/Payout_1 + 1/Payout_2 \ldots + 1/Payout_i \ldots 1/Payout_x)} \times 100\%$$

wherein the numerator comprises the inverse payout ratio of said participant, and wherein the denominator comprises the sum of all participant inverse payout ratios, from 1/Payout 1 to 1/Payout x for all participants from 1 to x where x is the total number of participants.

2. The method of claim one wherein said determination is carried out for a plurality of betting markets for the same contest and the same participants wherein all payouts are based on a uniform amount wagered, and said method further includes the step of averaging the resulting probabilities of all of said markets for each participant.

3. The method of claim one further including the step of displaying the results of said probability calculations on an internet site.

4. The method of claim one further including the steps of
A. selecting a first participant with the lowest available odds, said odds having an associated first projected bet payout;
B. selecting additional participants with higher available odds, said higher odds each having an associated additional projected bet payout; and
C. presenting the probability, Pi, calculation results in numerical order according to the odds associated with each participant from low to high and/or high to low.

* * * * *